(12) United States Patent
Salter et al.

(10) Patent No.: US 11,077,791 B2
(45) Date of Patent: Aug. 3, 2021

(54) FASCIA EXCITER

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Joshua Wheeler, Trenton, MI (US); Kristopher Karl Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 16/512,970

(22) Filed: Jul. 16, 2019

(65) Prior Publication Data

US 2021/0016707 A1 Jan. 21, 2021

(51) Int. Cl.
| B60Q 5/00 | (2006.01) |
| B60R 19/48 | (2006.01) |
| B60R 19/52 | (2006.01) |
| B60R 19/02 | (2006.01) |
| G10K 11/162 | (2006.01) |
| G10K 15/04 | (2006.01) |

(52) U.S. Cl.
CPC ............ *B60Q 5/005* (2013.01); *B60R 19/023* (2013.01); *B60R 19/48* (2013.01); *B60R 19/52* (2013.01); *G10K 11/162* (2013.01); *G10K 15/04* (2013.01); *B60Q 5/006* (2013.01)

(58) Field of Classification Search
CPC ........ B60Q 5/005; B60Q 5/006; B60R 19/48; B60R 19/52; B60R 19/023; G10K 11/162; G10K 15/04
See application file for complete search history.

(56) References Cited

U.S. PATENT DOCUMENTS

| 9,473,854 | B2 | 10/2016 | Yasuike et al. | |
| 10,457,207 | B2 * | 10/2019 | Lee | B60Q 9/00 |

FOREIGN PATENT DOCUMENTS

| DE | 102016217482 A1 | 3/2018 |
| DE | 102016217487 A1 | 3/2018 |
| JP | 2007283809 A | 11/2007 |
| WO | 201789041 A1 | 6/2017 |

* cited by examiner

*Primary Examiner* — D Glenn Dayoan
*Assistant Examiner* — Melissa Ann Bonifazi
(74) *Attorney, Agent, or Firm* — David Coppiellie; Carlson, Gaskey & Olds, P.C.

(57) ABSTRACT

An apparatus includes a vehicle body panel, a mount surface associated with the vehicle body panel, and at least one exciter mounted to the mount surface. The mount surface has a first stiffness and the vehicle body panel has a second stiffness that is less than the first stiffness such that sound is effectively transmitted to a surrounding environment via the mount surface and sound transmission back to a vehicle interior is dampened via the vehicle body panel.

22 Claims, 5 Drawing Sheets

FASCIA EXCITER

TECHNICAL FIELD

This disclosure relates generally to an exciter for a vehicle that effectively transmits sound to a surrounding environment and dampens sound transmission back to a vehicle interior.

BACKGROUND

Vehicles can include Acoustic Vehicle Alerting Systems (AVAS) speakers. The AVAS speakers emit sounds that can be communicated to vehicle users and pedestrians. AVAS speakers are expensive, bulky, difficult to package, and hard to clean and maintain.

SUMMARY

An apparatus according to an exemplary aspect of the present disclosure includes, among other things, a vehicle body panel, a mount surface associated with the vehicle body panel, and at least one exciter mounted to the mount surface. The mount surface has a first stiffness and the vehicle body panel has a second stiffness that is less than the first stiffness such that sound is effectively transmitted to a surrounding environment via the mount surface and sound transmission back to a vehicle interior is dampened via the vehicle body panel.

In a further non-limiting embodiment of the foregoing apparatus, the vehicle body panel comprises a fascia.

In a further non-limiting embodiment of any of the foregoing apparatus, the fascia includes a bumper and at least one grill.

In a further non-limiting embodiment of any of the foregoing apparatus, the bumper includes an opening, and a rigid insert plate is received within the opening, the rigid insert plate comprising the mount surface.

In a further non-limiting embodiment of any of the foregoing apparatus, the at least one grill is positioned within the opening to provide the mount surface.

In a further non-limiting embodiment of any of the foregoing apparatus, the fascia includes an upper reinforcement, and wherein the at least one grill is mounted to the upper reinforcement to provide the mount surface.

In a further non-limiting embodiment of any of the foregoing apparatus, the fascia includes a first portion having the first stiffness and a second portion that is integrally formed with the first portion and has the second stiffness, and wherein the first portion provides the mount surface and is smaller than the second portion.

In a further non-limiting embodiment of any of the foregoing apparatus the first portion includes at least one insert sheet of a first material that is surrounded by a second material to form a remaining portion of the first portion and the second portion.

In a further non-limiting embodiment of any of the foregoing apparatus, the first material comprises at least one prepreg or organo sheet of material and the second material is a plastic material that is molded around the at least one prepreg or organo sheet of material.

In a further non-limiting embodiment of any of the foregoing apparatus, the fascia comprises a bumper cover or shell.

In a further non-limiting embodiment of any of the foregoing apparatus, at least one temperature sensor measures temperatures at or near the mount surface, and including a control that adjusts power supplied to the exciter based on a measured temperature.

An apparatus, according to yet another exemplary aspect of the present disclosure includes, among other things, a fascia, a mount surface associated with the fascia, at least one exciter mounted to the mount surface and including a sound generator. The mount surface has a first stiffness and the fascia has a second stiffness that is less than the first stiffness such that sound is effectively transmitted to a surrounding environment via the mount surface and sound transmission back to a vehicle interior is dampened via the fascia. A power source supplies power to at least the exciter, and a control controls power supplied to the at least one exciter.

In a further non-limiting embodiment of any of the foregoing apparatus, at least one temperature sensor measures temperatures at or near the mount surface, and wherein the control adjusts power supplied to the exciter based on a measured temperature.

In a further non-limiting embodiment of any of the foregoing apparatus, the fascia includes a first portion having the first stiffness and a second portion that is integrally formed with the first portion and has the second stiffness, and wherein the first portion provides the mount surface and is smaller than the second body portion.

In a further non-limiting embodiment of any of the foregoing apparatus, the fascia comprises a bumper cover or shell.

In a further non-limiting embodiment of any of the foregoing apparatus, the fascia includes an opening, and including a rigid insert plate that is received within the opening, the rigid insert plate comprising the mount surface.

A method according to still another exemplary aspect of the present disclosure includes, among other things, associating a mount surface with a vehicle body panel, mounting at least one exciter to the mount surface, the at least one exciter including a sound generator, and providing the mount surface with a first stiffness and the vehicle body panel with a second stiffness that is less than the first stiffness such that sound is effectively transmitted to a surrounding environment via the mount surface and sound transmission back to a vehicle interior is dampened via the vehicle body panel.

In a further non-limiting embodiment of the foregoing method, the method includes measuring temperatures at or near the mount surface and adjusting power supplied to the exciter based on a measured temperature.

In a further non-limiting embodiment of any of the foregoing methods, the method includes forming the fascia with a first portion having the first stiffness and a second portion that is integrally formed with the first portion and has the second stiffness, and wherein the first portion provides the mount surface and is smaller than the second body portion.

In a further non-limiting embodiment of any of the foregoing methods, the method includes forming an opening in the fascia and mounting a rigid insert plate within the opening, the rigid insert plate comprising the mount surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary exciter incorporated into a vehicle panel. The exciter is mounted to effectively transmit sound to a surrounding environment and dampen sound transmission back to a vehicle interior.

Figure 1:
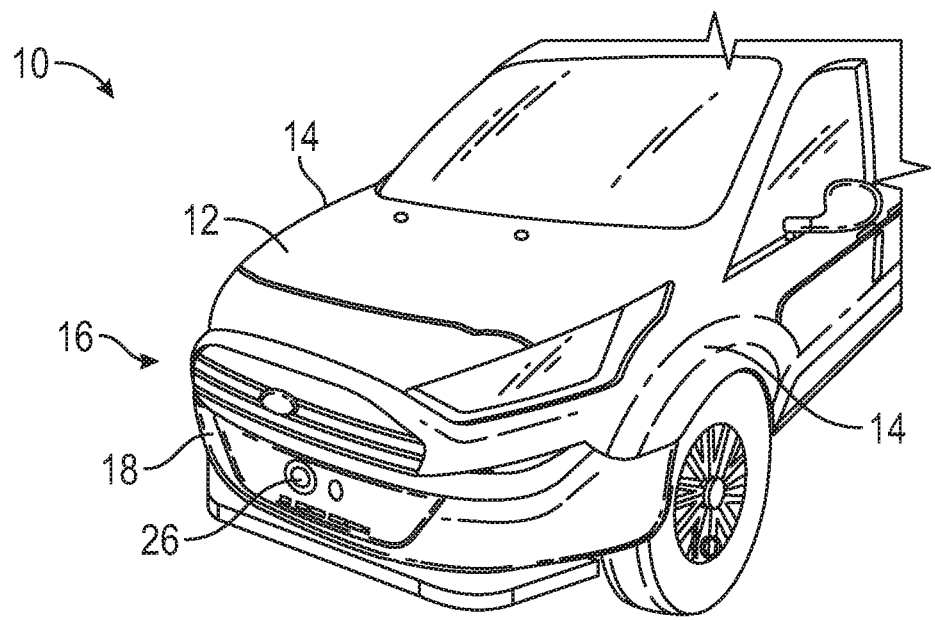
FIG. 1 illustrates a vehicle incorporating an exciter in a fascia.
Figure 3:
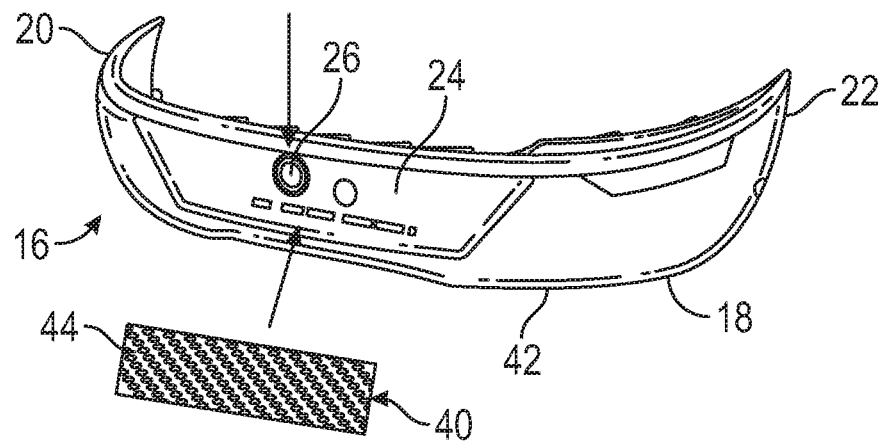
FIG. 3 is a perspective view of the fascia and a reinforcing material.

FIG. 1 shows a vehicle 10 having a hood 12 extending between body side panels 14. A fascia 16 is located forward of the hood 12 and includes a front panel or bumper 18 that extends between first 20 and second 22 opposing ends. The bumper 18 includes an area that comprises a mount surface 24 as shown in FIG. 3. At least one exciter 26 is mounted to the mount surface 24. The mount surface 24 has a first stiffness and the front panel or bumper 18 has a second stiffness that is less than the first stiffness such that sound is effectively transmitted to a surrounding environment via the mount surface 24 and sound transmission back to a vehicle interior is dampened via the front panel or bumper 18.

In one example shown in FIG. 3, the mount surface 24 is located generally on the bumper 18 in a center location that would usually be an area for mounting a license plate. License plates are typically not located in this area any longer, which makes it an ideal location for the exciter 26. However, the mount surface 24 can also be positioned at different locations along the length of the bumper 18 or multiple mount surfaces 24 could be provided on the bumper 18 in any combination of locations to most effectively transmit the sound.

Figure 2:
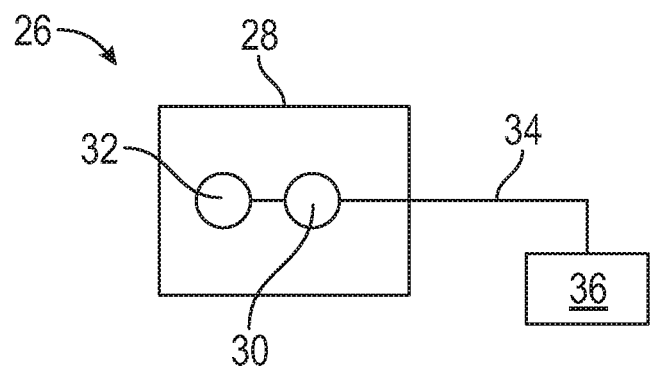
FIG. 2 is a schematic representation of an exciter.

As known, an exciter 26 includes a housing 28 (FIG. 2) with internal components such as a driver/actuator 30 and voice coil 32 that are used to generate sound. The driver/actuator 30 can be a motor assembly, for example. The voice coil 32 is coupled directly to the mount surface 24, which allows it to amplify the sound and make it a "speaker." The exciter 26 includes a wire connection 34 to a power source and control module 36. When it is determined that the exciter 26 is to communicate a noise to the surrounding environment, the control module 36 generates a signal that is transmitted to the exciter 26 and it begins to vibrate at the frequency of the signal. These vibrations transfer through the mount surface 24 to emit the desired sound.

As discussed above, the exciter 26 can be positioned any where within the fascia 16 and/or in other vehicle panels such as the hood, side panels, etc. Further, while a front bumper 18 is shown in FIG. 1, an exciter can also be located within a rear bumper. In one example, the bumper 18 comprises an outer shell or cover that includes the mount surface 24.

Figure 4:
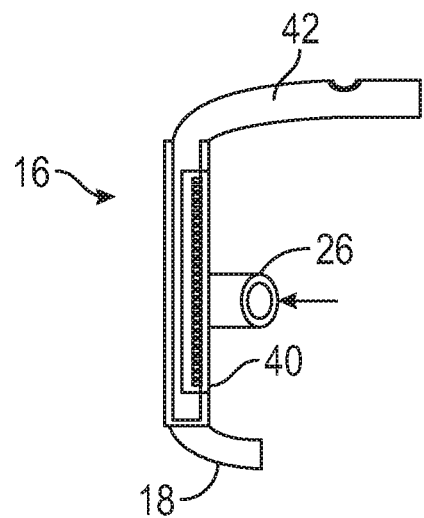
FIG. 4 is a section view of the fascia with the reinforcing material and exciter.

In the example shown in FIGS. 3-4, the bumper 18 includes a first portion 40 having a first stiffness and a second portion 42 that is integrally formed with the first portion 40 and has a second stiffness that is less than the first stiffness. The first portion 40 provides the mount surface 24 and is smaller than the second portion 42. In one example, the first portion 40 includes at least one insert sheet 44 of a first material that is surrounded by a second material to form a remaining portion of the first portion 40 and the second portion 42. The first material comprises at least one prepreg or organo sheet of material and the second material is a plastic material that is molded around the at least one prepreg or organo sheet of material. In one example, the plastic material comprises a thermoplastic olefinic (TPO) elastomer and the prepreg or organo sheet of material comprises a woven carbon fiber.

The sound exciter 26, in the example shown, is mounted at the center of the bumper shell or cover of the bumper 18. Most bumper covers are made from flexible TPO, which has a flex modulus that is about 1.5 GPa. However, a TPO elastomer is too flexible to be a good sound transmitter as it will act as a sound deadener. The use of the insert sheet 44 at the mount surface 24 will make the fascia 16 relatively stiff in front of the exciter 26 so that the sound can be efficiently transmitted from the exciter 26. By inserting a prepreg or organo sheet of woven carbon fiber in a bumper tool during molding, the bumper cover or shell is locally stiffened in the desired area such that the sound from the exciter 26 can be efficiently transmitted at desired volume levels. One advantage of using a center area of the bumper is that it is relatively flat and is in the center of the vehicle such that sound can be heard from either side of the vehicle 10. Optionally, lower cost basalt or glass prepreg or organo sheets can be used; however, carbon fiber will yield about twice the stiffness.

The use of the insert sheet 44 will stiffen the desired local area but will allow the remaining portion of the bumper cover to be flexible, which is desired to enable the cover to absorb energy in low speed contact events without damage to an associated fender or adjacent body panel. The area with the molded insert sheet 44 will be approximately 10 to 15 times stiffer than the TOP elastomer used to form the remaining portion of the bumper cover or shell. The flex modulus of this reinforced section of the bumper fascia 16 will be approximately 15-20 GPa as compared to the flex modulus of 1.5 GPa for the TPO elastomer material.

In one example, the bumper cover is manufactured in an automated insert molding cell where the organo sheets or prepreg sheets are loaded in a magazine and a robot loads the sheets in an infrared heating system while the prior part is being molded. Next, the robot loads the hot sheet in the tool placing it in the open injection mold in the center of the bumper cover tool. The sheet is held in place with a vacuum force. The robot picks up the next sheet and places it in the infrared oven while the mold is being closed and the bumper cover is molded. Once the bumper cover is cooled, it is removed from the mold and the process repeats.

Figure 5A:
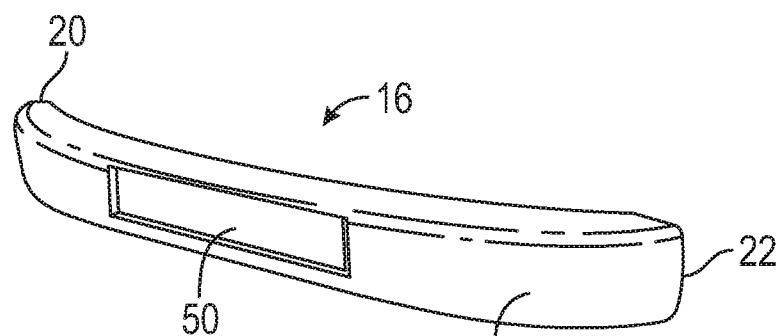
FIG. 5A is a perspective view of a front of a fascia.
Figure 5B:
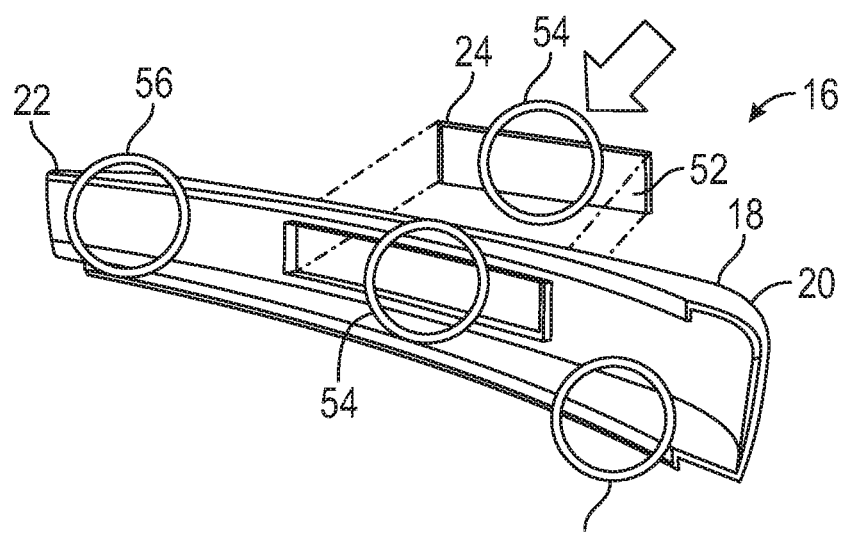
FIG. 5B is a rear view of the fascia of FIG. 5A and which shows different mounting locations for an exciter.

FIGS. 5A-5B show another example of an exciter mount configuration. FIG. 5A shows a front view of a fascia 16 having an opening 50 and FIG. 5B shows a rear view of the fascia 16 of FIG. 5A. In this example, the fascia 16 includes grill or insert plate 52 that is associated with the opening 50 in the bumper shell or cover of the fascia 16. The insert plate 52 has a stiffness that is greater than a stiffness of the TOP elastomer material used to form the bumper shell or cover. The insert plate 52 comprises a rigid structure with a flat and solid surface the provides the mount surface 24 for the exciter 26. The mount surface 24 of the rigid insert plate 52 provides for effective sound transmission to a surrounding environment via the mount surface 24, while the softer material of the remaining portion of the fascia 16 dampens sound transmission back to the vehicle interior.

As shown in FIG. 5B, the insert plate 52 is positioned near a center of the bumper cover or shell as indicated at 54. Optional, mounting locations are indicated at 56. Any of the mounting locations 54, 56 can include the insert plate 52 or can include a locally stiffened portion 40 such as that shown in FIGS. 3-4.

Figure 6:
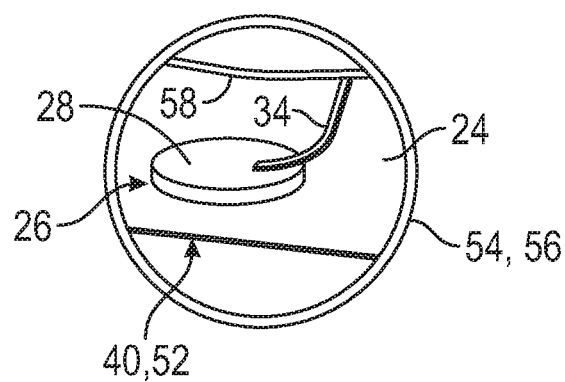
FIG. 6 is a schematic representation of the exciter that can be used in each of the different mounting locations of FIG. 5B.

As shown in FIG. 6, the exciter 26 that is mounted in each of the locations 54, 56 includes a wire connection 34 that connects to a wiring harness 58 or other similar structure. The wiring harness 58 connects the exciter 26 to the power source and control module 36. The main body or housing 28 of the exciter 26 is fixed directly to the mount surfaces 24 of the insert plate 52 or locally stiffened portion 40.

Figure 7A:
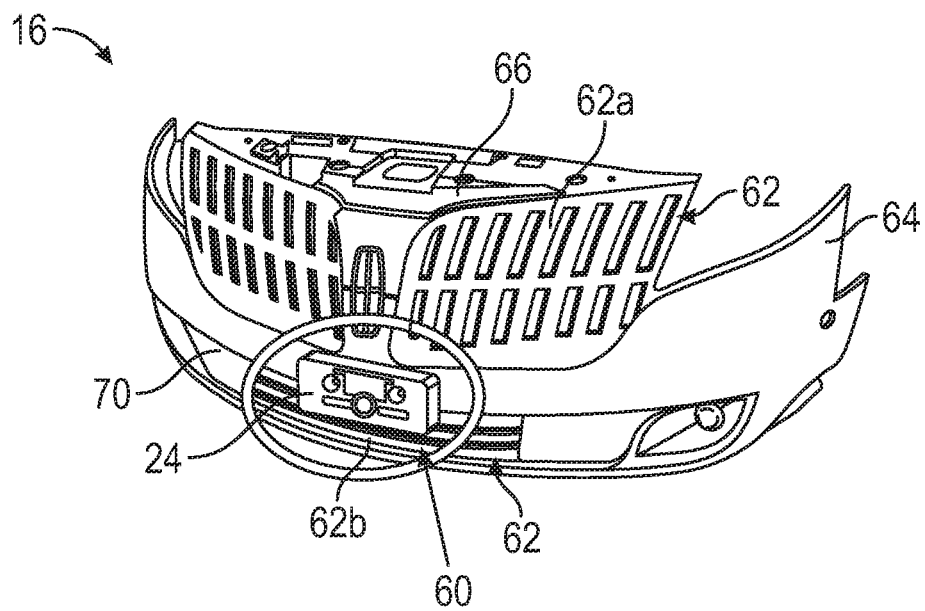
FIG. 7A is a perspective view of another example of a front of a fascia.
Figure 7B:
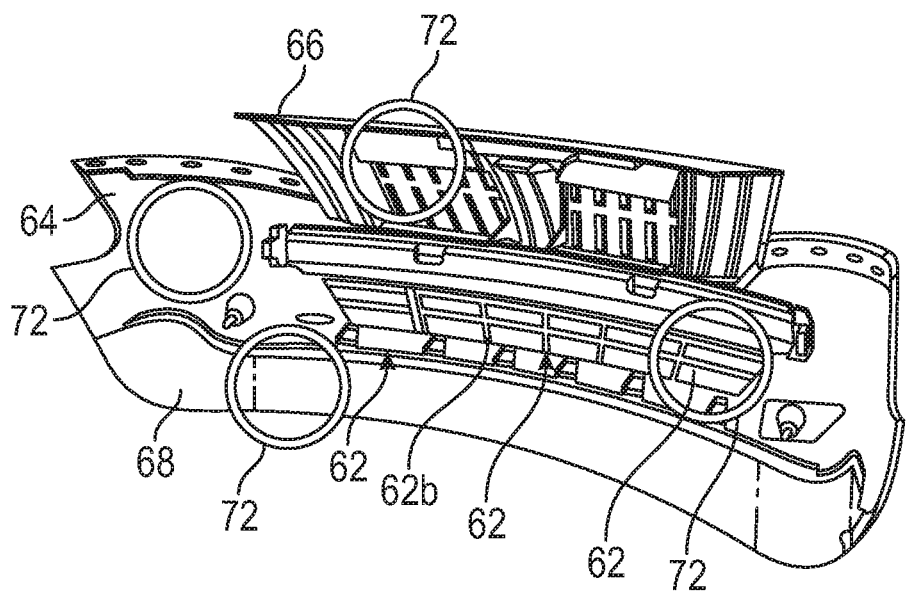
FIG. 7B is a rear view of the fascia of FIG. 7A and which shows different mounting locations for an exciter.

FIGS. 7A-7B show another example of an exciter mount configuration. FIG. 7A shows a front view of a fascia 16 having a front license plate area 60 and FIG. 7B shows a rear view of the fascia 16 of FIG. 7A. In this example, the fascia 16 includes a plurality of grills 62. A main or upper grill 62a is positioned along an upper edge of a bumper shell or cover 64 and a lower grill 62b is along the lower edge of the cover 64. An upper reinforcement 66 is used to provide additional support for the upper grill 62a. A valence 68 extends underneath the lower grill 62b. The exciter 26 of FIG. 6 can be mounted to the license plate area 60 as indicated at 70. Optional mounting locations are indicated at 72, e.g. at the upper grill 62a, upper reinforcement 66, bumper cover 64, valence 68, etc. Any of the mounting locations 70, 72 can include the insert plate 52 or can include a locally stiffened portion 40 such as that shown in FIGS. 3-4.

Figure 8:
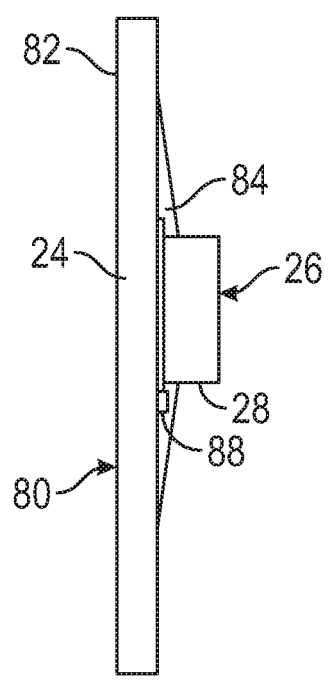
FIG. 8 is a schematic view of an exciter that is insert molded into a vehicle body panel.

FIG. 8 is a schematic view of an exciter 26 that is insert molded into a panel 80 that provides the mount surface 24. The panel 80 can comprise the insert plate 52 or can include a locally stiffened portion 40, for example. An exterior surface 82 has an applique interface over-molded so that the exciter 26 has an adhesive-free, positive, and fixed installation that ensures a rigid interface for the best vibration transfer. In one example, the housing 28 comprises an interface ring that is placed in a mold that is then overmolded in one shot. An optional second shot 84 of material could also be used. This would involve molding the panel 80 first and then inserting both the panel 80 and the ring in a second mold to receive the second shot 84.

In one example, at least one temperature sensor 88 is associated with the exciter 26. The temperature sensor 88 can be a stand-alone sensor that is separately attached, or can be integrated with the mount surface 24 or the exciter itself. In one example, the sensor 88 can be insert molded into the panel 80.

The stiffer the panel 80 the more efficiently the exciter 26 works; however, the stiffness of plastics can vary considerably with temperature. For example, a dark colored fascia in the sun in a hot climate would have a higher temperature than a lighter colored fascia. When the panel 80 is cold it takes less power to get the same amount of sound out of the panel 80. As such, there is a need to compensate for temperature to keep the volume at the correct level. The temperature sensor 88 in the exciter 26 can sense temperature of the mount surface 24, panel 80, and/or exciter 26 and compensate accordingly to provide more power or less power to achieve a constant volume.

The temperature sensor 88 communicates temperature data to the power source and control module 36 and temperature compensation could be executed by a simple look-up table of temperature vs. compensation. Additionally, compensation can take into account factors such as material of the fascia 16, panel 80, and/or the material and type of reinforcement that is being used. If temperatures are higher more power is supplied to the exciter 26, and if temperatures are lower less power is supplied to the exciter 26.

By packaging the exciter 26 in the soft fascia/bumper cover it avoids having to use AVAS speakers, which are bulky and hard to package, expensive, exposed to dirt/grime, and hard to clean. The subject configuration also solves issues with forward transmission partially blocked and sound bleed back into the passenger cabin. Additionally, the exciter 26 can be used to generate different types of sounds when a certain vehicle condition is experienced. For example, if a high brake force or skid occurs a desired noise can be generated to alert pedestrians and others that the vehicle is near. Further, the exciter 26 could generate a noise that could be used as a vehicle identification source. A specific tone can be generated such that a pedestrian can recognize a certain vehicle within a fleet of vehicles when approached with key or a bluetooth signal from a phone in a ride share situation.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
    a vehicle panel comprising a fascia or a body panel;
    a mount surface associated with the fascia or body panel, wherein the mount surface comprises a locally stiffened area or a rigid member that forms a portion of the fascia or body panel; and
    at least one exciter mounted to the mount surface, and wherein the mount surface has a first stiffness and the vehicle body panel has a second stiffness that is less than the first stiffness such that sound is effectively transmitted to a surrounding environment via the mount surface and sound transmission back to a vehicle interior is dampened via the vehicle body panel.

2. The apparatus according to claim 1, wherein the vehicle panel comprises the fascia and wherein the fascia includes a bumper and at least one grill.

3. The apparatus according to claim 2, wherein the bumper includes an opening, and wherein the rigid member comprises a rigid insert plate that is received within the opening, the rigid insert plate comprising the mount surface.

4. The apparatus according to claim 2, wherein the fascia includes an opening, and wherein the rigid member comprises the at least one grill, and wherein the at least one grill is positioned within the opening to provide the mount surface.

5. The apparatus according to claim 2, wherein the rigid member comprises the at least one grill, and wherein the fascia includes an upper reinforcement, and wherein the at least one grill is mounted to the upper reinforcement to provide the mount surface.

6. The apparatus according to claim 1, wherein the vehicle panel comprises the fascia and wherein the fascia includes a first portion comprising the locally stiffened portion and having the first stiffness and a second portion that is integrally formed with the first portion and has the second stiffness, and wherein the first portion provides the mount surface and is smaller than the second portion.

7. The apparatus according to claim 6, wherein the first portion includes at least one insert sheet of a first material that is surrounded by a second material to form a remaining portion of the first portion and the second portion.

8. The apparatus according to claim 7, wherein the first material comprises at least one prepreg or organo sheet of material and the second material is a plastic material that is molded around the at least one prepreg or organo sheet of material.

9. The apparatus according to claim 7, wherein the fascia comprises a bumper cover or shell.

10. The apparatus according to claim 1, including at least one temperature sensor to measure temperatures at or near the mount surface, and including a control that adjusts power supplied to the exciter based on a measured temperature.

11. An apparatus comprising:
a fascia;
a mount surface associated with the fascia, wherein the mount surface comprises a locally stiffened area or a rigid member that forms a portion of the fascia;
at least one exciter mounted to the mount surface and including a sound generator, and wherein the mount surface has a first stiffness and the fascia has a second stiffness that is less than the first stiffness such that sound is effectively transmitted to a surrounding environment via the mount surface and sound transmission back to a vehicle interior is dampened via the fascia;
a power source to supply power to at least the exciter; and
a control that controls power supplied to the at least one exciter.

12. The apparatus according to claim 11, including at least one temperature sensor to measure temperatures at or near the mount surface, and wherein the control adjusts power supplied to the exciter based on a measured temperature.

13. The apparatus according to claim 11, wherein the fascia includes a first portion comprising the locally stiffened portion and having the first stiffness and a second portion that is integrally formed with the first portion and has the second stiffness, and wherein the first portion provides the mount surface and is smaller than the second body portion.

14. The apparatus according to claim 13, wherein the fascia comprises a bumper cover or shell.

15. The apparatus according to claim 11, wherein the fascia includes an opening, and wherein the rigid member comprises a rigid insert plate that is received within the opening, the rigid insert plate comprising the mount surface.

16. A method comprising:
associating a mount surface with a vehicle panel comprising a fascia or a body panel;
forming the mount surface as a locally stiffened area or a rigid member that forms a portion of the fascia or the body panel;
mounting at least one exciter to the mount surface, the at least one exciter including a sound generator; and
providing the mount surface with a first stiffness and the vehicle body panel with a second stiffness that is less than the first stiffness such that sound is effectively transmitted to a surrounding environment via the mount surface and sound transmission back to a vehicle interior is dampened via the vehicle body panel.

17. The method according to claim 16, including measuring temperatures at or near the mount surface and adjusting power supplied to the exciter based on a measured temperature.

18. The method according to claim 16, wherein the vehicle panel comprises the fascia, and including forming the fascia with a first portion comprising the locally stiffened portion and having the first stiffness and a second portion that is integrally formed with the first portion and has the second stiffness, and wherein the first portion provides the mount surface and is smaller than the second body portion.

19. The method according to claim 16, wherein the vehicle panel comprises the fascia, and including forming an opening in the fascia and wherein the wherein the rigid member comprises a rigid insert plate that is mounted within the opening, the rigid insert plate comprising the mount surface.

20. The method according to claim 16, including insert molding the exciter to the vehicle panel that provides the mount surface.

21. The method according to claim 20, wherein
the vehicle panel comprises the body panel, and including providing an exterior surface that has an applique interface over-molded so that the exciter has an adhesive-free, positive, and fixed installation to the body panel, or
the vehicle panel comprises the fascia and the exciter is molded to the rigid member or the locally stiffened portion.

22. The apparatus according to claim 1, wherein
the vehicle panel comprises the body panel, and wherein the body panel has an exterior surface that has an applique interface over-molded so that the exciter has an adhesive-free, positive, and fixed installation to the body panel, or
the vehicle panel comprises the fascia and the mount surface comprises
the locally stiffened area comprising at least one insert sheet of material integrally formed with the fascia, or
the rigid member comprising a rigid plate or grill that is mounted to the fascia.

* * * * *